US012021341B2

(12) United States Patent
Costello et al.

(10) Patent No.: US 12,021,341 B2
(45) Date of Patent: Jun. 25, 2024

(54) TAP POWER CONNECTOR ASSEMBLY

(71) Applicant: TE Connectivity Solutions GmbH, Schaffhausen (CH)

(72) Inventors: Brian Patrick Costello, Scotts Valley, CA (US); Michael James Horning, Landisville, PA (US); Harshita Guduru, Plano, TX (US)

(73) Assignee: TE CONNECTIVITY SOLUTIONS GMBH, Schaffhausen (CH)

( * ) Notice: Subject to any disclaimer, the term of this patent is extended or adjusted under 35 U.S.C. 154(b) by 304 days.

(21) Appl. No.: 17/688,865

(22) Filed: Mar. 7, 2022

(65) Prior Publication Data

US 2023/0282995 A1 Sep. 7, 2023

(51) Int. Cl.
*H01R 4/50* (2006.01)
*H01R 12/70* (2011.01)
*H01R 12/73* (2011.01)

(52) U.S. Cl.
CPC ....... *H01R 4/5083* (2013.01); *H01R 12/7041* (2013.01); *H01R 12/732* (2013.01); *H01R 2201/04* (2013.01)

(58) Field of Classification Search
CPC .............. H01R 4/5083; H01R 12/7041; H01R 12/732; H01R 2201/04
USPC .......................................................... 361/748
See application file for complete search history.

(56) References Cited

U.S. PATENT DOCUMENTS 5,769,645 A 6/1998 Martin et al.
2009/0298349 A1* 12/2009 Filipon .............. H01R 13/6658 439/669
2010/0304581 A1* 12/2010 Davis .................. H01R 12/727 439/65

* cited by examiner

*Primary Examiner* — Andargie M Aychillhum

(57) ABSTRACT

A power connector assembly transferring power between a supply connector assembly and a tap connector assembly includes a front interface module mated with the supply connector assembly and a rear interface module mounted to a host circuit board. The power connector assembly includes a power tap module between the front interface module and the rear interface module having power tap contacts each electrically connected to corresponding front and rear power contacts. Each power tap contact includes a tap interface exterior of the front housing and exterior of the rear housing configured to be terminated to the tap connector assembly. The power tap contact electrically connecting the front power contact and the tap connector assembly to transfer power from the supply connector assembly to the tap connector assembly.

20 Claims, 9 Drawing Sheets

TAP POWER CONNECTOR ASSEMBLY

BACKGROUND OF THE INVENTION

The subject matter herein relates generally to electrical connector systems.

Electrical connector systems are used for data communication between various electrical components. Some electrical connector systems transmit power to power the various electrical components. Typical electrical connector systems use board mounted power connectors that receive power from a power supply and deliver the power to a host circuit board. The power is used to power electrical components mounted to the host circuit board. To power another device, a separate, additional board mounted power connector is needed, which occupies space on the host circuit board and requires power trace routing between the board mounted power connectors.

A needs remains for an efficient and reliable power connector for an electrical connector system.

BRIEF DESCRIPTION OF THE INVENTION

In one embodiment, a power connector assembly configured to transfer power between a supply connector assembly and a tap connector assembly is provided. The power connector assembly includes a front interface module configured to be mated with the supply connector assembly. The front interface module includes a front housing has a front receptacle and front power contacts in the front receptacle configured to be mated with the supply connector assembly. The power connector assembly includes a rear interface module configured to be mounted to a host circuit board. The rear interface module includes a rear housing has a rear receptacle and rear power contacts in the rear receptacle configured to be terminated to the host circuit board. The power connector assembly includes a power tap module between the front interface module and the rear interface module. The power tap module includes power tap contacts. Each power tap contact is electrically connected to the corresponding front power contact and the corresponding rear power contact. Each power tap contact includes a tap interface exterior of the front housing and exterior of the rear housing. The tap interface configured to be terminated to the tap connector assembly. The power tap contact electrically connecting the front power contact and the tap connector assembly to transfer power from the supply connector assembly to the tap connector assembly.

In another embodiment, a power connector assembly configured to transfer power between a supply connector assembly and a tap connector assembly is provided and includes. The power connector assembly includes a power connector housing extending between a front and a rear. The power connector housing has a mating end at the front configured to be mated with the supply connector assembly. The power connector housing has a mounting end at the rear configured to be mounted to a host circuit board. The power connector housing has an internal chamber. The power connector assembly includes power contacts received in the internal chamber of the power connector housing. The power contacts include an upper array of upper power contacts and a lower array of lower power contacts. The upper power contacts facing the lower power contacts across a receptacle slot at the mating end. The upper power contacts are provided at the mating end for electrical connection with the supply connector assembly. The upper power contacts are provided at the mounting end for electrical connection with the host circuit board. The lower power contacts are provided at the mating end for electrical connection with the supply connector assembly. The lower power contacts are provided at the mounting end for electrical connection with the host circuit board. The power connector assembly includes a power tap module coupled to the power connector housing. The power tap module includes power tap contacts. Each power tap contact is electrically connected to the corresponding upper power contact and the corresponding lower power contact. Each power tap contact includes a tap interface exterior of the power connector housing. The tap interface configured to be terminated to the tap connector assembly. The power tap contacts electrically connecting the upper and lower power contacts with the tap connector assembly to transfer power from the supply connector assembly to the tap connector assembly.

In a further embodiment, an electrical connector system is provided and includes a power connector assembly including a power connector housing holding power contacts and a power tap module. The power connector housing extending between a front and a rear. The power connector housing has a mating end at the front configured to be mated with the supply connector assembly. The power connector housing has a mounting end at the rear configured to be mounted to a host circuit board. The power contacts include an upper array of upper power contacts and a lower array of lower power contacts. The upper power contacts facing the lower power contacts across a receptacle slot at the mating end. The upper power contacts are provided at the mating end for electrical connection with the supply connector assembly. The upper power contacts are provided at the mounting end for electrical connection with the host circuit board. The lower power contacts are provided at the mating end for electrical connection with the supply connector assembly. The lower power contacts are provided at the mounting end for electrical connection with the host circuit board. The power tap module includes power tap contacts. Each power tap contact is electrically connected to the corresponding upper power contact and the corresponding lower power contact. Each power tap contact includes a tap interface exterior of the power connector housing. The electrical connector system includes a tap connector assembly coupled to the power connector assembly. The tap connector assembly includes a tap connector housing holding tap contacts. The tap contacts include tap mating interfaces coupled to the tap interfaces of the corresponding tap contacts to electrically connect to the power connector assembly to transfer power from the supply connector assembly to the tap connector assembly.

DETAILED DESCRIPTION OF THE INVENTION

Figure 1:
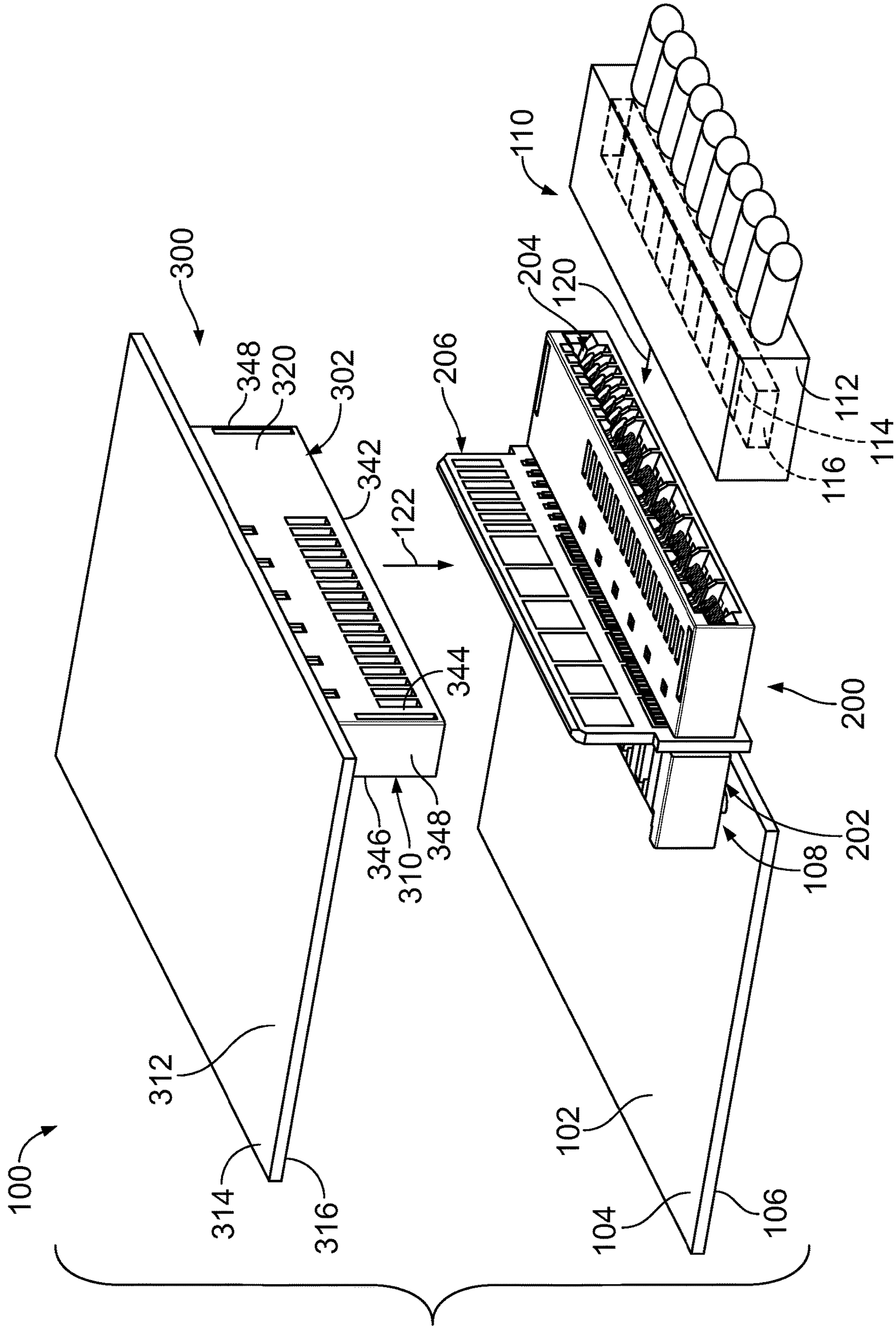
FIG. 1 is a top perspective view of an electrical connector system in accordance with an exemplary embodiment.
Figure 2:
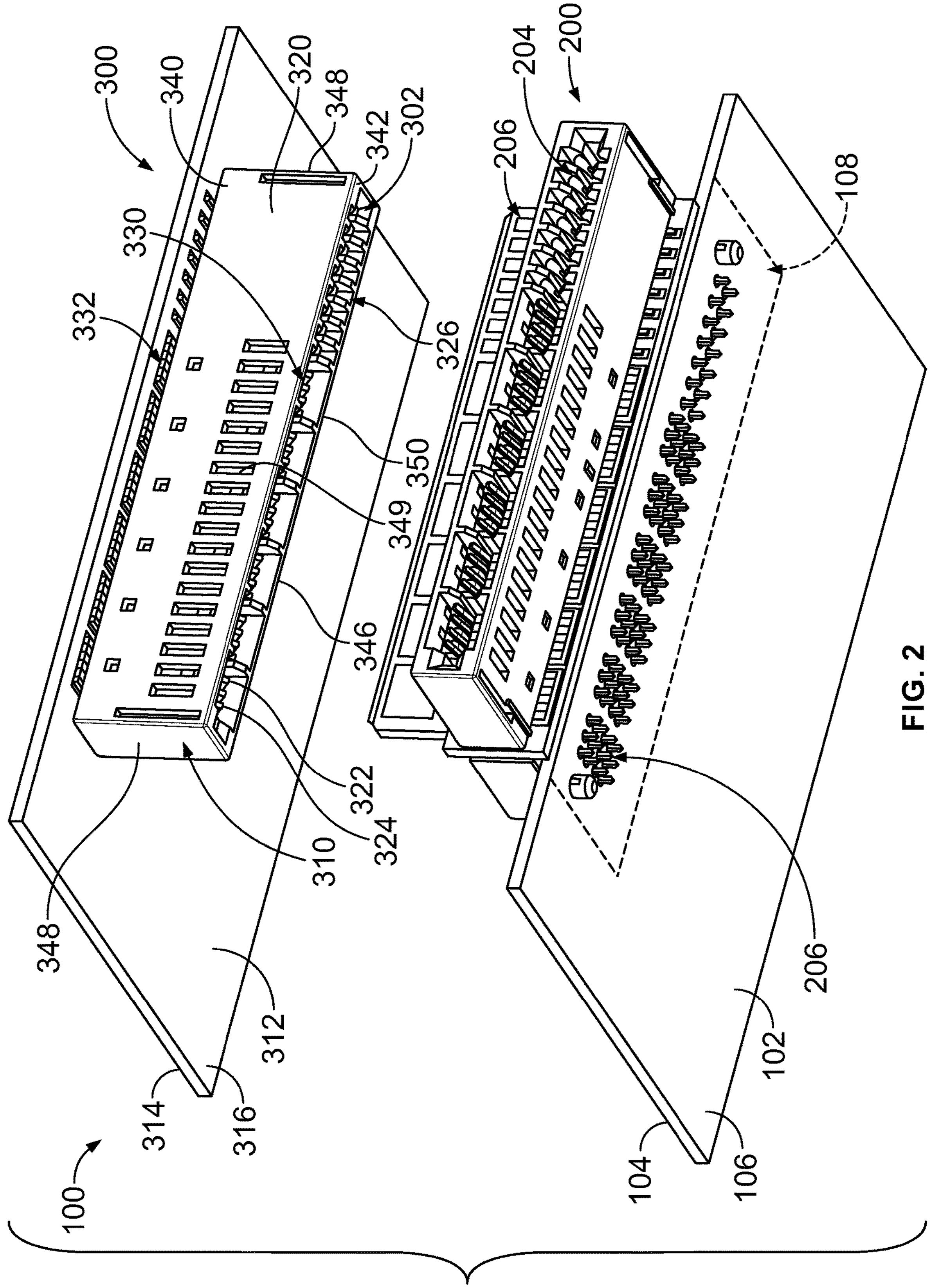
FIG. 2 is a bottom perspective view of the electrical connector system in accordance with an exemplary embodiment.

FIG. 1 is a top perspective view of an electrical connector system 100 in accordance with an exemplary embodiment. FIG. 2 is a bottom perspective view of the electrical connector system 100 in accordance with an exemplary embodiment. The electrical connector system 100 includes a power connector assembly 200 configured to transfer power from a supply connector assembly 110 to at least one of a host circuit board 102 and a tap connector assembly 300.

In an exemplary embodiment, the power connector assembly 200 is configured to be mounted to the host circuit board 102. The power connector assembly 200 is mechanically and electrically connected to the host circuit board 102 at a board interface 202. The supply connector assembly 110 is configured to be removably coupled to the power connector assembly 200 at a mating interface 204. The tap connector assembly 300 is configured to be removably coupled to the power connector assembly 200 at a tap interface 206. Power is transferred through the power connector assembly 200 from the mating interface 204 to the board interface 202 and/or the tap interface 206. The power may be supplied to other components mounted to the host circuit board 102 and/or the tap connector assembly 300. In an exemplary embodiment, the power connector assembly 200 has a standard interface at the mating interface 204, such as a common redundant power supply (CRPS) receptacle interface in the supply connector assembly 110 has a complementary interface, such as a CRPS plug interface. Optionally, data signals by be transferred through the assembly 200 from the mating interface 204 to the board interface 202 and the tap interface 206. In an exemplary embodiment, the power connector assembly 200 has a standard interface at the tap interface 206, such as a CRPS plug interface. The tap connector assembly 300 may have a standard interface, such as a CRPS receptacle interface.

The host circuit board 102 includes an upper surface 104 and a lower surface 106. The power connector assembly 200 is mounted to the host circuit board 102 and a mounting area 108 on the upper surface 104. For example, the power connector assembly 200 may be soldered to circuits of the host circuit board 102 at the mounting area 108. Additionally or alternatively, the power connector assembly 200 may be press-fit into vias of the host circuit board 102. Optionally, mounting hardware may be used to mount the power connector assembly 200 to the host circuit board 102. Other electrical components may be mounted to the upper surface 104 and/or the lower surface 106. Power may be supplied, via circuits of the host circuit board 102, from the power connector assembly 200 to the other electrical components mounted to the host circuit board 102. For example, traces, pads, vias, or other circuit elements of the host circuit board 102 may be used to electrically connect the power connector assembly 200 to the other electrical components. However, in alternative embodiments, rather than supplying the power to the host circuit board 102, the power connector assembly 200 may supply all of the power from the supply connector assembly 110 to the tap connector assembly 300, which may reduce the need for power circuits within the host circuit board 102, which may reduce the overall cost of the host circuit board 102.

In an exemplary embodiment, the supply connector assembly 110 is a plug connector configured to be pluggably coupled to the mating interface 204 of the power connector assembly 200. The supply connector assembly 110 may be mated to the power connector assembly 200 in a mating direction 120. The mating direction 120 may be parallel to the plane of the host circuit board 102. For example, the mating direction 120 may be in a horizontal direction. In various embodiments, the supply connector assembly 110 may be a cable connector having power cables supplying power to the supply connector assembly 110. In other various embodiments, the supply connector assembly 110 may be a board connector having a circuit board supplying power to the supply connector assembly 110. In further embodiments, the supply connector assembly 110 may be a busbar connector having a busbar supplying power to the supply connector assembly 110.

The supply connector assembly 110 includes a supply connector housing 112 and a plurality of supply connector contacts 114 (shown in phantom) held by the supply connector housing 112. In an exemplary embodiment, the supply connector assembly 110 includes a plug element 116 (shown in phantom) at a mating end of the supply connector assembly 110. The plug element 116 is configured to be plugged into the power connector assembly 200 at the mating interface 204. The supply connector contacts 114 may be stamped and formed contacts in various embodiments. For example, the supply connector contacts 114 may be blades, spring beams, sockets, pins, or other types of contacts. The supply connector contacts 114 extend along the plug element 116, such as along an upper surface and a lower surface of the plug element 116. Power cables may be terminated to the supply connector contacts 114, such as being soldered or crimped to the ends of the supply connector contacts 114 In alternative embodiments, the supply connector contacts 114 may be circuit elements of a circuit card. The circuit card has a card edge that defines the plug element 116. The circuit card includes pads or traces along the upper surface and the lower surface of the circuit card that define the supply connector contacts 114.

The tap connector assembly 300 is configured to be mated with the power connector assembly 200 in a tap mating direction 122. The tap mating direction 122 may be oriented generally perpendicular to the mating direction 120. For example, the tap mating direction 122 may be oriented in a vertical direction. In the illustrated embodiment, the tap connector 310 is mated to the power connector assembly 200 from above. The tap connector assembly 300 has a separable mating interface 302 configured to be removably coupled to the tap interface 206 of the power connector assembly 200. The tap connector assembly 300 defines a power takeoff device configured to tap into the power supplied to the power connector assembly 200 and take off some or all of the power for powering other components electrically connected to the tap connector assembly 300.

In an exemplary embodiment, the tap connector assembly 300 includes a tap connector 310 coupled to a mezzanine circuit board 312. The mezzanine circuit board 312 includes an upper surface 314 and a lower surface 316. In the illustrated embodiment, the tap connector 310 is coupled to the lower surface 316 of the mezzanine circuit board 312 and faces the power connector assembly 200. The tap connector 310 is configured to be coupled to the tap interface 206 of the power connector assembly 200 to supply power to the mezzanine circuit board 312. Other electrical components (not shown) may be mounted to the upper surface 314 and/or the lower surface 316 of the mezzanine circuit board 312. In an exemplary embodiment, when the tap connector assembly 300 is coupled to the power connector assembly 200, the mezzanine circuit board 312 extend parallel to and spaced apart from the host circuit board 102.

The tap connector 310 includes a tap connector housing 320 holding tap contacts 322. The tap contacts 322 have tap mating interfaces 324 configured to be electrically connected to the power connector assembly 200. In an exemplary embodiment, the tap connector 310 includes a receptacle 326 that receives a portion of the power connector assembly 200. For example, the receptacle 326 may be a card slot elongated along the length of the tap connector housing 320. In various embodiments, the tap connector 310 may be a card edge connector. The tap contact 322 are arranged within the receptacle 326 for electrical connection to the power connector assembly 200. In various embodiments, the tap contacts 322 may be arranged in a first row and a second row on opposite sides of the receptacle 326. For example, the tap contacts 322 may include front tap contacts arranged along the front of the receptacle 326 and rear tap contacts arranged along a rear of the receptacle 326.

In an exemplary embodiment, each tap contact 322 includes a mating end 330 and a terminating end 332. The mating end 330 is located within the receptacle 326. The mating end 330 may include a spring beam or other deflectable contact forming a separable mating interface. Other types of mating interfaces may be provided in alternative embodiments, such as blades, sockets, pins, and the like. The terminating end 332 is provided at the end of the tap connector housing 320 for electrical connection to the mezzanine circuit board 312. In the illustrated embodiment, the terminating ends 332 are solder tails configured to be soldered to the mezzanine circuit board 312. Other types of interfaces may be provided in alternative embodiments, such as compliant pins or press-fit pins configured to be press-fit into the mezzanine circuit board 312. In other alternative embodiments, the terminating ends may be configured for termination to components other than the mezzanine circuit board 312, such as power cables. For example, the terminating ends may be solder pads or crimp barrels configured to be terminated to ends of power cables. In the illustrated embodiment, the mating ends 330 are located at bottoms of the tap contact 322 and the terminating ends 332 are located at tops of the tap contacts 322. Other orientations are possible in alternative embodiments.

In an exemplary embodiment, the tap connector housing 320 includes a top 340 and a bottom 342. The tap connector housing 320 includes a front 344 and a rear 346 extending between the top 340 and the bottom 342. The tap connector housing 320 extends between opposite sides 348. The receptacle 326 is elongated between the sides 348. The receptacle 326 may be open at the bottom 342 to receive the power connector assembly 200. The tap connector housing 320 may include locating features 350 for locating the power connector assembly 200 in the receptacle 326, such as for centering the power connector assembly 200 within the receptacle 326 for mating with the tap contacts 322. The locating features 350 may have a lead-in surfaces to guide the power connector assembly 200 into the receptacle 326. Optionally, the tap connector housing 320 may include separating walls extending across the receptacle 326 to divide the receptacle 326 into separate contact channels having separate tap contact 322, such as to electrically isolate the tap contacts 322.

Figure 3:
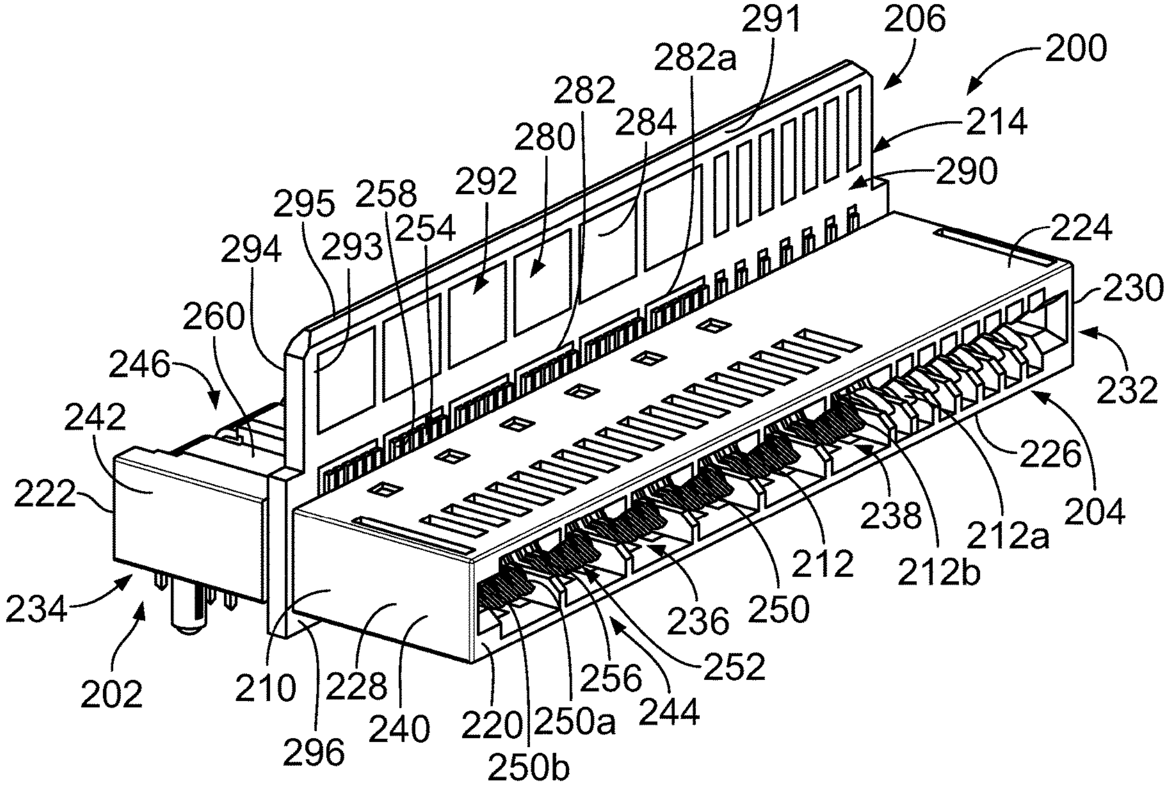
FIG. 3 is a front perspective view of the power connector assembly in accordance with an exemplary embodiment.
Figure 4:
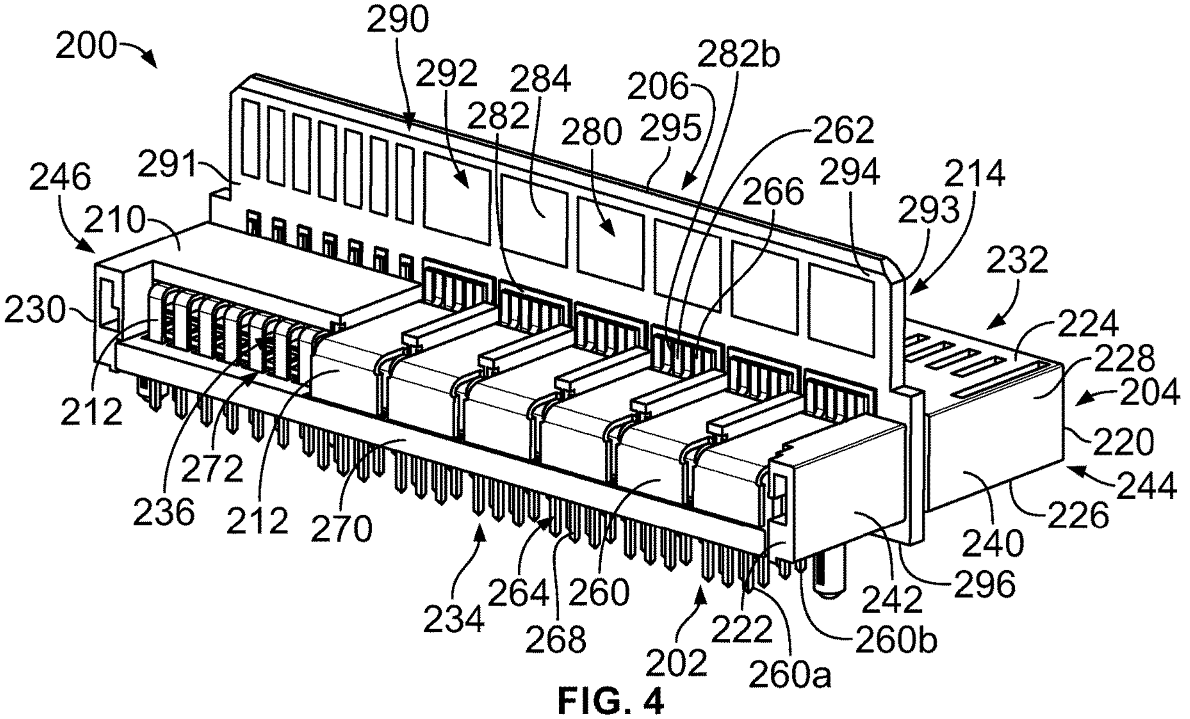
FIG. 4 is a rear perspective view of the power connector assembly in accordance with an exemplary embodiment.

FIG. 3 is a front perspective view of the power connector assembly 200 in accordance with an exemplary embodiment. FIG. 4 is a rear perspective view of the power connector assembly 200 in accordance with an exemplary embodiment. The power connector assembly 200 includes a power connector housing 210 holding a plurality of power contacts 212. The power connector assembly 200 includes a power tap module 214 coupled to the power connector housing 210. The power tap module 214 is electrically connected to the power contacts 212 to form a power tap or power takeoff from the power contacts 212. The power connector housing 210 is configured to be mounted to the host circuit board 102 (shown in FIG. 1). The supply connector assembly 110 (shown in FIG. 1) is configured to be mated to the power connector housing 210. The tap connector assembly 300 (shown in FIG. 1) is configured to be coupled to the power tap module 214.

The power connector housing 210 includes a front 220 and a rear 222. The power connector housing 210 includes a top 224 and the bottom 226. The power connector housing 210 includes a first side 228 and a second side 230. In an exemplary embodiment, the power connector housing 210 includes a mating end 232 at the front 220 and a mounting end 234 at the rear 222. The mating end 232 defines the mating interface 204. The mounting end 234 defines the board interface 202. The mounting end 234 is configured to be mounted to the host circuit board 102. In the illustrated embodiment, the mounting end 234 extends along the bottom 226 at the rear 222. The mounting end 234 may be at other locations in alternative embodiments, such as along the top 224 or along the rear 222. In an exemplary embodiment, the power connector housing 210 includes an internal chamber 236 that receives the power contacts 212. Portions of the power contacts 212 may be accessible inside the internal chamber 236, such as for mating with the supply connector assembly 110. For example, in an exemplary embodiment, the power connector housing 210 includes a receptacle 238 at the mating end 232 forming a portion of the internal chamber 236. The receptacle 238 may be a card slot or other type of receptacle configured to receive a portion of the supply connector assembly 110. For example, the receptacle 238 may receive the plug element 116 (shown in FIG. 1) of the supply connector assembly 110. Portions of the power contacts 212 may be accessible exterior of the power connector housing 210, such as for termination to the host circuit board 102 and/or for termination to the power tap module 214 and/or for mating with the supply connector assembly 110.

In an exemplary embodiment, the power connector housing 210 is a multi-piece housing. For example, the power connector housing 210 includes a front housing 240 and a rear housing 242. In the illustrated embodiment, the power tap module 214 is located between the front housing 240 and the rear housing 242. For example, the front housing 240 is mounted to a front portion of the power tap module 214 and the rear housing 242 is mounted to a rear portion of the power tap module 214.

The power contacts 212 are held by the power connector housing 210. Mating portions of the power contacts 212 are provided at the mating interface 204 for mating with the supply connector assembly 110. Mounting portions of the power contacts 212 are provided at the board interface 202 for electrical connection with the host circuit board 102. Tap portions of the power contacts 212 are located between the mating portions and the mounting portions for electrical connection to the power tap module 214. Optionally, the tap portions may be approximately centered along the power contacts 212 between the mating portions and the mounting portions.

In an exemplary embodiment, the power contacts 212 are multi-piece contacts. For example, each power contact 212 may include a front power contact 250 and a rear power contact 260. The front power contacts 250 are received in the front housing 240. For example, the front power contacts 250 are located in the receptacle 238 for mating with the plug element 116 of the supply connector assembly 110. The rear power contacts 260 are received in the rear housing 242, such as in a rear receptacle or contact channels forming the internal chamber 236 of the rear housing 242. The front power contacts 250 define the mating portions of the power contacts 212. The rear power contacts 260 define the mounting portions of the power contacts 212. The front power contacts 250 are configured to be electrically connected to the power tap module 214. The rear power contacts 260 are configured to be electrically connected to the power tap module 214. The power tap module 214 is configured to electrically connect the front power contacts 250 and the corresponding rear power contacts 260.

In an exemplary embodiment, the front housing 240 and the front power contacts 250 form a front interface module 244 of the power connector assembly 200. The rear housing 242 and the rear power contacts 260 form a rear interface module 246 of the power connector assembly 200. The power tap module 214 is located between the front interface module 244 and the rear interface module 246. The power tap module 214 separates the front interface module 244 from the rear interface module 246 and electrically connects the front power contacts 250 of the front interface module 244 with the rear power contacts 260 of the rear interface module 246. In an exemplary embodiment, the front power contacts 250 are configured to be soldered to the power tap module 214 to mechanically and electrically connect the front interface module 244 to the power tap module 214 and the rear power contacts 260 are configured to be soldered to the power tap module 214 to mechanically and electrically connect the rear interface module 246 to the power tap module 214.

In an exemplary embodiment, the front power contacts 250 are stamped and formed contacts. The front power contacts 250 may be formed from one or more lead frames. Each front power contact 250 extends between a mating end 252 and a terminating end 254. The mating end 252 is located within the receptacle 238 for electrical connection to the supply connector assembly 110. In the illustrated embodiment, the mating end 252 includes a deflectable spring beam 256. Optionally, the mating end 252 may include multiple spring beams 256. Other types of interfaces may be provided at the mating end 252, such as a blade, a pin, a socket, a tuning fork contact, and the like. In an exemplary embodiment, the front power contact 250 includes a solder tail 258 at the terminating end 254 configured to be soldered to the power tap module 214. Optionally, the terminating end 254 may include multiple solder tails 258. Other types of interfaces may be provided at the terminating end 254, such as a compliant pin, a press-fit pin, a solder pad, a solder ball, a mating pin, a socket, and the like.

In an exemplary embodiment, the rear power contacts 260 are stamped and formed contacts. Optionally, the rear power contacts 260 may be right angle contacts having a right angle bend along the length of the rear power contacts 260 transitioning from the power tap module 214 to the host circuit board 102. The rear power contacts 260 may be formed from one or more lead frames. Each rear power contact 260 extends between a mating end 262 and a terminating end 264. The mating end 262 is configured to be coupled to the power tap module 214. In an exemplary embodiment, the mating end 262 includes a solder tail 266 configured to be soldered to the power tap module 214. Optionally, the mating end 262 may include multiple solder tails 266. Other types of interfaces may be provided at the mating end 262, such as a compliant pin, a press-fit pin, a solder pad, a solder ball, a mating pin, a socket, and the like. In an exemplary embodiment, the rear power contact 260 includes a solder tail 268 at the terminating end 264 configured to be soldered to the host circuit board 102. Optionally, the terminating end 264 may include multiple solder tails 268. Other types of interfaces may be provided at the terminating end 264, such as a compliant pin, a press-fit pin, a solder pad, a solder ball, a mating pin, a socket, and the like. In an exemplary embodiment, a pin organizer 270 is provided at the mounting end 234 to hold the terminating ends 264 of the rear power contacts 260 for connection to the host circuit board 102. The pin organizer 270 includes openings 272 that receive corresponding rear power contacts 260 to hold relative positions of the rear power contacts 260.

In an exemplary embodiment, the power contacts 212 are arranged in multiple arrays. For example, the power contacts 212 may be arranged in an upper array of upper power contacts 212*a* and a lower array of the lower power contacts 212*b*. The upper power contacts 212*a* are arranged in one or more rows above the receptacle 238 for interfacing with the supply connector contacts 114 along the upper surface of the plug element 116. The lower power contacts 212*b* are arranged in one or more rows below the receptacle 238 for interfacing with the supply connector contacts 114 along the lower surface of the plug element 116. The front power contacts 250 form front portions of the upper and lower power contacts 212*a* 212*b*, which may be referred to hereinafter as upper front power contacts 250*a* and lower front power contacts 250*b*, respectively. The rear power contacts 260 form rear portions of the upper and lower power contacts 212*a*, 212*b*, which may be referred to hereinafter as upper rear power contacts 260*a* and lower rear power contacts 260*b*, respectively.

The power tap module 214 is used to electrically connect the power contacts 212 and the tap connector assembly 300 (shown in FIG. 1) to transfer power from the supply connector assembly 110 to the tap connector assembly 300. The power tap module 214 includes a plurality of power tap contacts 280, which are electrically connected to the corresponding power contacts 212. Each power tap contact 280 includes a contact interface 282 and a tap interface 284. The contact interface 282 is connected to the corresponding power contact 212. In an exemplary embodiment, each power tap contact 280 includes a front contact interface 282*a* coupled to the corresponding front power contact 250 and a rear contact interface 282*b* coupled to the corresponding rear power contact 260. However, the power tap contact 280 may include a single contact interface in alternative embodiments. Optionally, multiple front power contacts 250 may be connected to the same power tap contact 280 and/or multiple rear power contacts 260 may be connected to the same power tap contact 280. The tap interface 284 is configured to be connected to the corresponding tap contact 322 (shown in FIGS. 1 and 2) of the tap connector assembly 300.

In an exemplary embodiment, the power tap module 214 includes a power tap circuit board 290 having a substrate 291 and a plurality of power tap circuits 292 on one or more layers of the substrate 291. The power tap circuits 292 define the power tap contacts 280. The power tap circuits 292 may include traces, pads, vias, or other type of circuit elements of the power tap circuit board 290. The substrate 291 includes a first surface 293 (for example, front surface) and a second surface 294 (for example, rear surface). The power tap circuit board 290 includes a card edge 295, such as at a top of the substrate 291. The card edge 295 is configured to be plugged into the tap connector assembly 300. The tap interfaces 284 of the power tap contacts 280 are provided at or near the card edge 295, such as along both the first surface 293 and the second surface 294. The contact interfaces 282 are provided at or near a bottom edge 296 of the substrate 291, such as along both the first surface 293 and the second surface 294.

When assembled, the power tap circuit board 290 is sandwiched between the front interface module 244 and the rear interface module 246. The front interface module 244 is mechanically and electrically connected to the front side of the power tap circuit board 290. The rear interface module 246 is mechanically and electrically connected to the rear side of the power tap circuit board 290. Power is supplied to the power tap circuit board 290 through the front power contacts 250. Power is supplied from the front power contacts 250 to the tap connector assembly 300 through the power tap circuits 292 defining the power tap contacts 280. Power is supplied from the front power contacts 250 to the rear power contacts 260 through the power tap circuits 292 defining the power tap contacts 280. Power is supplied from the power tap circuit board 290 to the host circuit board 102 through the rear power contacts 260.

Figure 5:
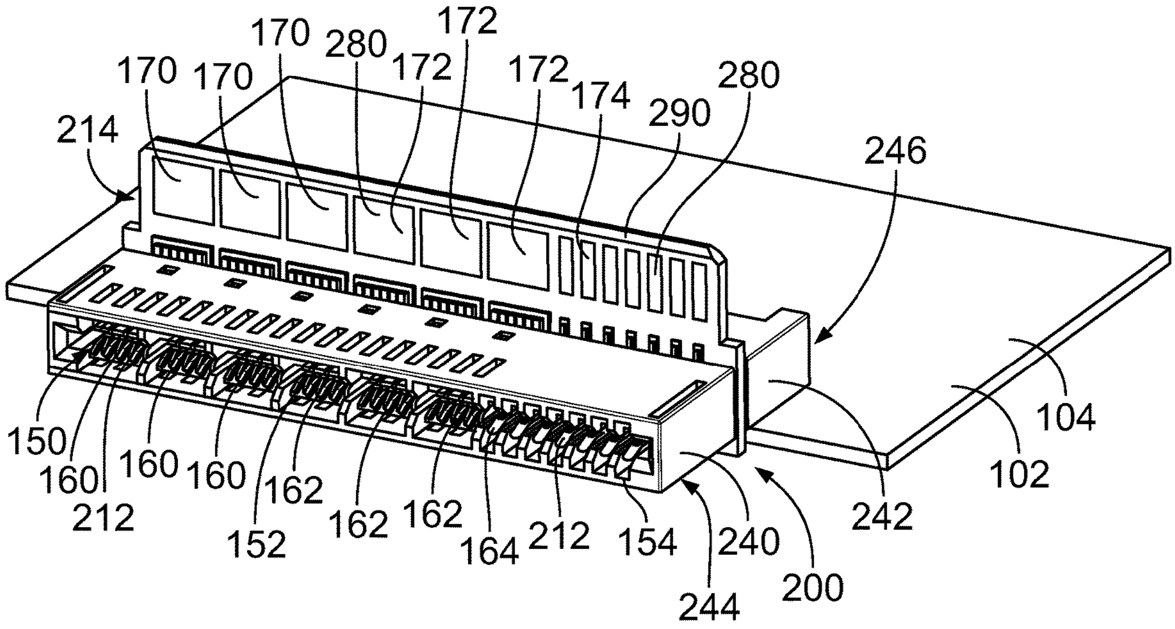
FIG. 5 is a front perspective view of the power connector assembly in accordance with an exemplary embodiment mounted to the host circuit board.
Figure 6:
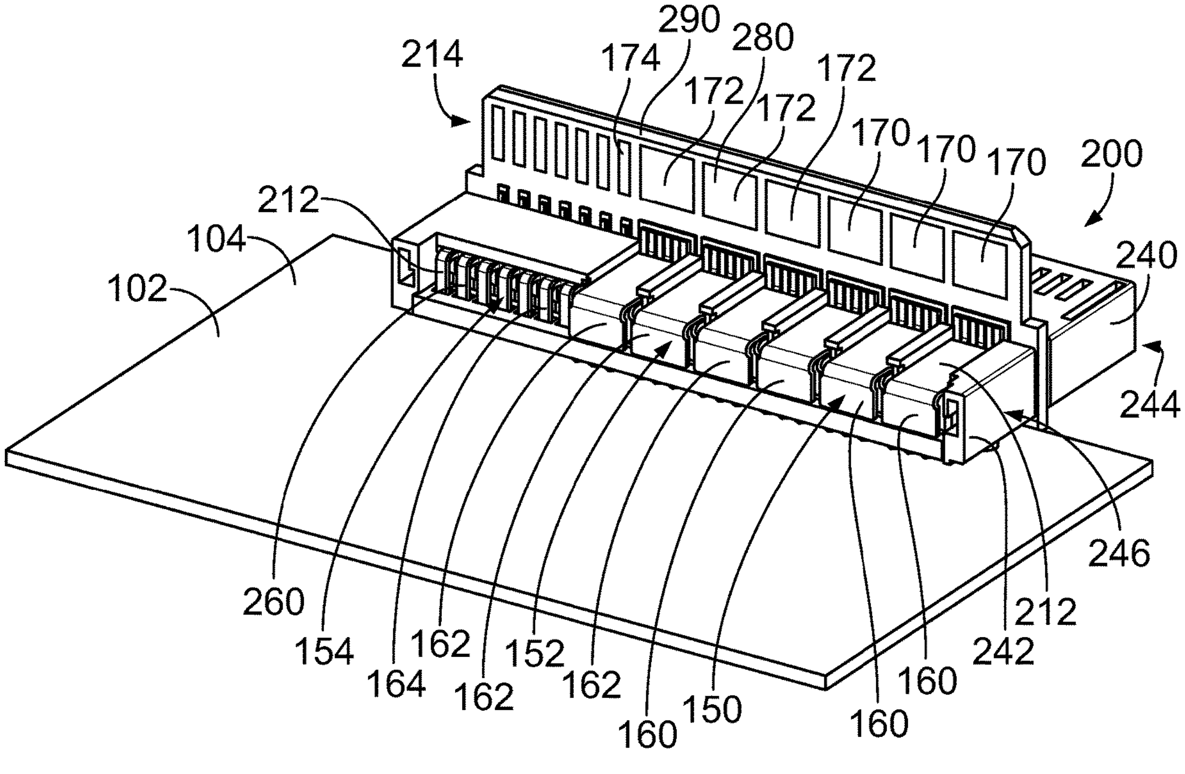
FIG. 6 is a rear perspective view of the power connector assembly in accordance with an exemplary embodiment to the host circuit board.

FIG. 5 is a front perspective view of the power connector assembly 200 in accordance with an exemplary embodiment mounted to the host circuit board 102. FIG. 6 is a rear perspective view of the power connector assembly 200 in accordance with an exemplary embodiment to the host circuit board 102.

In the illustrated embodiment, the power connector assembly 200 is mounted to the upper surface 104 of the host circuit board 102, such as proximate to an edge of the host circuit board 102. The rear interface module 246 is mounted to the host circuit board 102. For example, the rear power contacts 260 are terminated to the host circuit board 102. In the illustrated embodiment, the power tap module 214 is coupled to the front of the rear interface module 246. The front interface module 244 is coupled to the front of the power tap module 214 and extends forward of the host circuit board 102 for electrical connection with the supply connector assembly 110. The upper portion of the power tap circuit board 290 extends above the front interface module 244 and the rear interface module 246 for electrical connection with the tap connector assembly 300 (shown in FIG. 1). The power tap contacts 280 are exposed exterior of the front housing 240 in the rear housing 242 for electrical connection with the tap connector assembly 300. For example, the power tap contacts 280 may be received in the receptacle of the tap connector assembly 300.

In an exemplary embodiment, the power connector assembly 200 includes different types of contacts, such as positive contacts and negative contacts or cathodes and anodes that form a power circuit. In other various embodiments, the power connector assembly 200 includes load contacts and ground return contacts that form a power circuit (for example, voltage supply 150 and voltage return 152). The power connector assembly 200 may include contacts configured to transmit data (for example, signal contacts 154). In the illustrated embodiment, the power contacts 212 include load contacts 160, ground return contacts 162, and signal contacts 164. Optionally, a plurality of the load contacts 160 may be grouped together (for example, in a group of three), a plurality of the ground return contacts 162 may be grouped together (for example, in a group of three), and a plurality of the signal contacts 164 may be grouped together (for example, in a group of seven). Other arrangements are possible in alternative embodiments. The power tap contacts 280 include complementary types of contacts, such as load contacts 170, ground return contacts 172, and signal contacts 174. The contacts 280 may thus tap into the signal contacts 174 in addition to the load contacts 170 and the ground return contacts 172 to transmit the data signals to multiple outputs.

Figure 7:
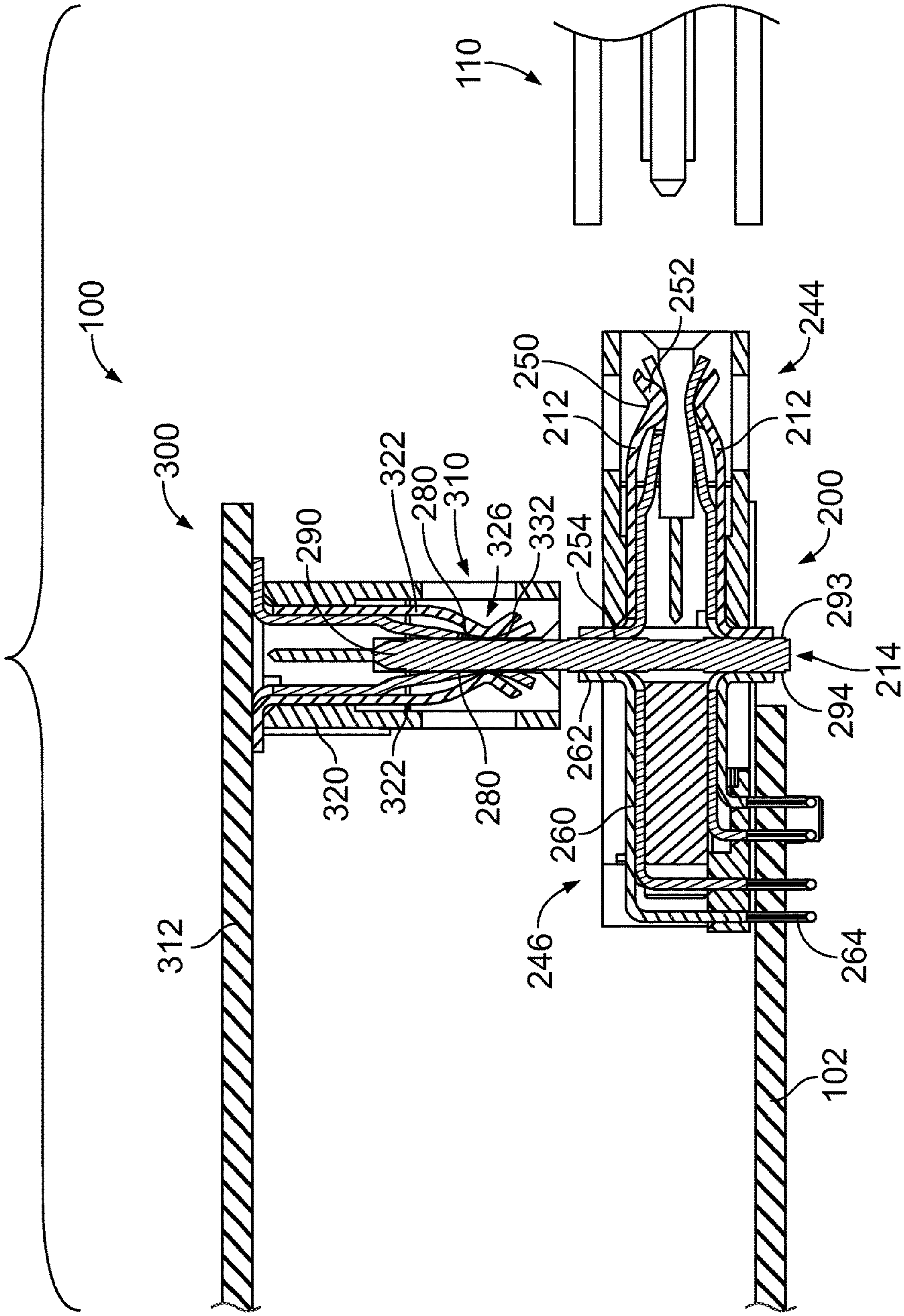
FIG. 7 is a cross-sectional view of the electrical connector system in accordance with an exemplary embodiment.

FIG. 7 is a cross-sectional view of the electrical connector system 100 in accordance with an exemplary embodiment. FIG. 7 illustrates the power connector assembly 200 coupled to the host circuit board 102. FIG. 7 illustrates the tap connector assembly 300 coupled to the power connector assembly 200.

The power connector assembly 200 includes the power tap module 214 between the front interface module 244 and the rear interface module 246. The power tap module 214 includes the power tap circuit board 290 defining the interface between the power contacts 212 of the power connector assembly 200 and the tap connector assembly 300. The top end of the power tap circuit board 290 is configured to be plugged into the receptacle 326 of the tap connector housing 320. The tap contacts 322 are mated to the first side 293 and the second side 294 of the power tap circuit board 290 to electrically connect to the power tap contacts 280. The terminating ends 332 of the tap contacts 322 are terminated to the mezzanine circuit board 312. The terminating ends 254 of the front power contacts 250 are terminated to the first side 293 of the power tap circuit board 290. The mating ends 262 of the rear power contacts 260 are terminated to the second side 294 of the power tap circuit board 290. The terminating ends 264 of the rear power contacts 260 are terminated to the host circuit board 102.

When the mating ends 252 of the front power contacts 250 are mated to the supply connector assembly 110 (shown in FIG. 1), power is supplied to the tap connector assembly 300 and/or the host circuit board 102 through the power connector assembly 200. For example, power is supplied to the tap connector assembly 300 through the power tap circuit board 290 and power is supplied to the host circuit board 102 through the rear power contacts 260.

In an exemplary embodiment, the front interface module 244 is identical to the tap connector 310. For example, both the front interface module 244 and the tap connector 310 are card edge connectors configured to be surface mounted to the power tap circuit board 290 and the mezzanine circuit board 312, respectively. Utilization of the identical card edge connectors within the electrical connector system 100 reduces different part count and thus reduces the overall cost of the system.

Figure 8:
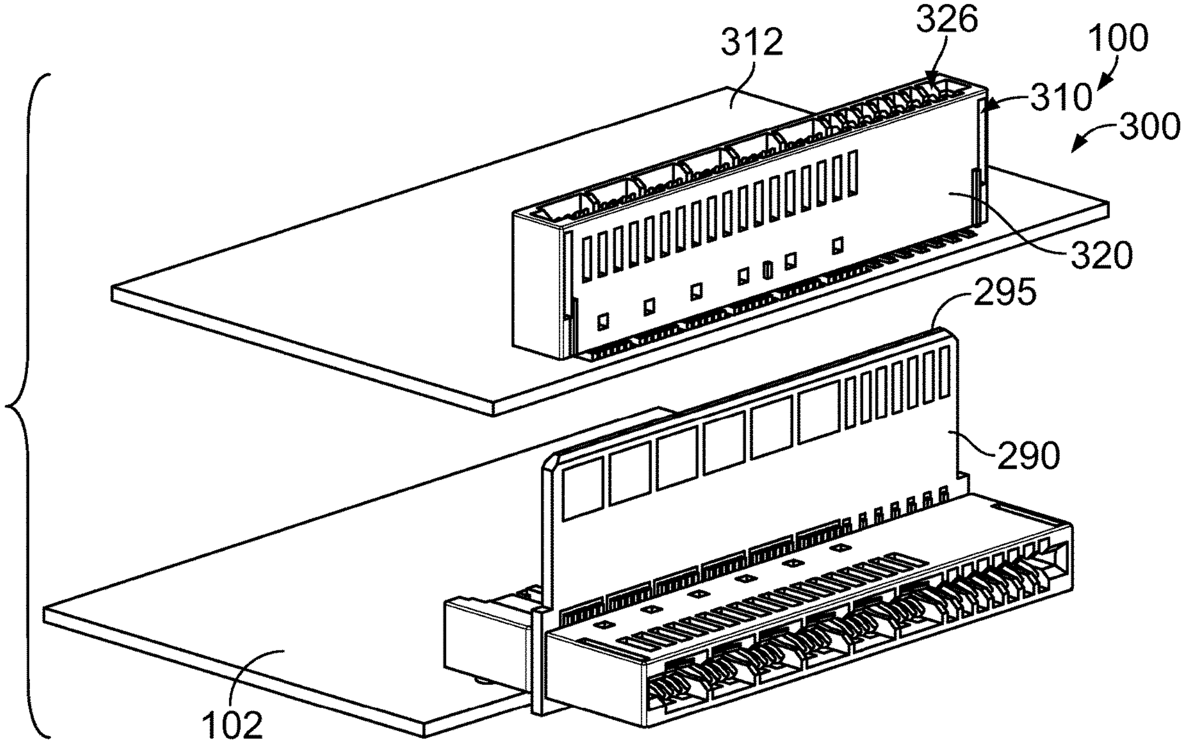
FIG. 8 is a top perspective view of an electrical connector system in accordance with an exemplary embodiment.
Figure 9:
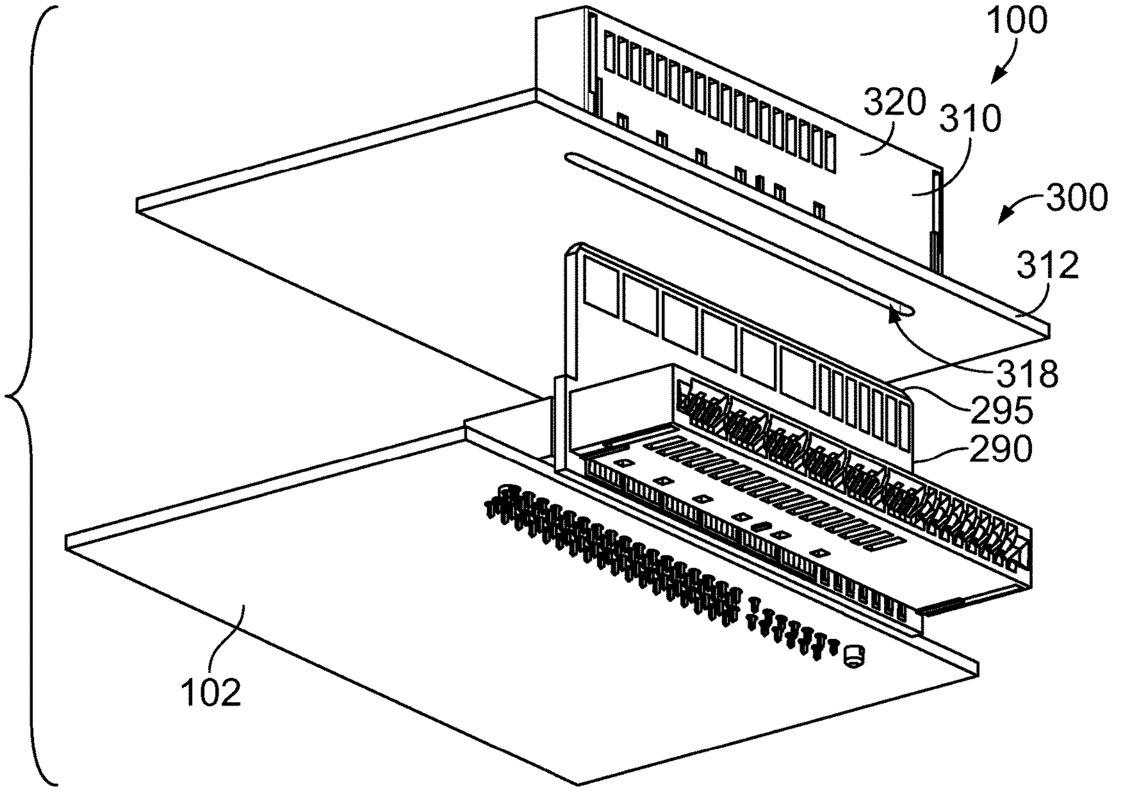
FIG. 9 is a bottom perspective view of the electrical connector system in accordance with an exemplary embodiment.

FIG. 8 is a top perspective view of an electrical connector system 100 in accordance with an exemplary embodiment. FIG. 9 is a bottom perspective view of the electrical connector system 100 in accordance with an exemplary embodiment.

In the illustrated embodiment, the tap connector assembly 300 is inverted relative to the orientation shown in FIGS. 1 and 2. For example, the tap connector 310 is located above the mezzanine circuit board 312. In the illustrated embodiment, the mezzanine circuit board 312 includes a slot 318 therethrough aligned with the receptacle 326 of the tap connector housing 320. The slot 318 is configured to receive the card edge 295 of the power tap circuit board 290. The slot 318 provides access to the receptacle 326 to allow loading of the card edge 295 into the receptacle 326 from below the tap connector 310. Such an arrangement allows the mezzanine circuit board 312 to be stacked in closer proximity to the host circuit board 102, which may reduce the overall height of the electrical connector system 100.

Figure 10:
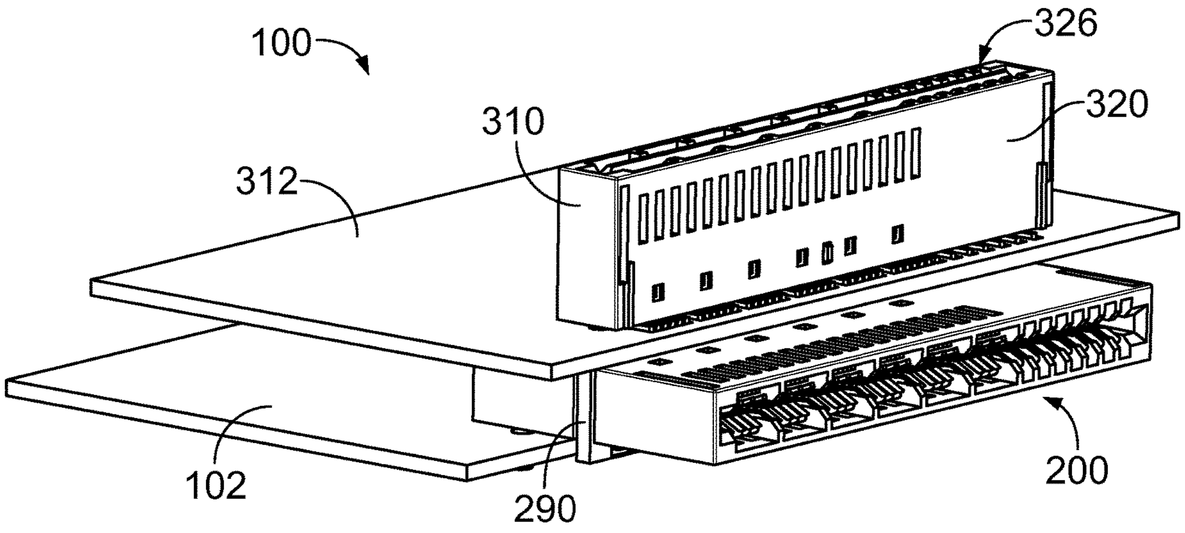
FIG. 10 is a front perspective view of the electrical connector system in accordance with an exemplary embodiment showing the tap connector assembly coupled to the power connector assembly.
Figure 11:
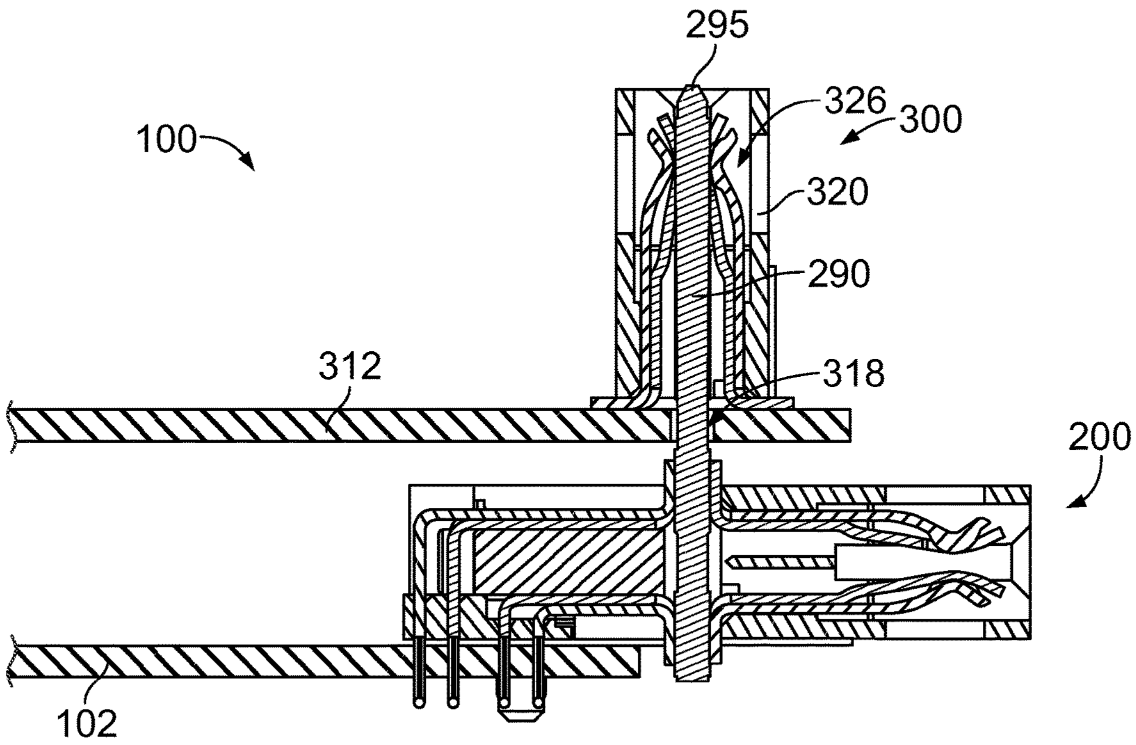
FIG. 11 is a cross-sectional view of the electrical connector system in accordance with an exemplary embodiment showing the tap connector assembly coupled to the power connector assembly.

FIG. 10 is a front perspective view of the electrical connector system 100 in accordance with an exemplary embodiment showing the tap connector assembly 300 coupled to the power connector assembly 200. FIG. 11 is a cross-sectional view of the electrical connector system 100 in accordance with an exemplary embodiment showing the tap connector assembly 300 coupled to the power connector assembly 200.

When mated, the card edge 295 at the top of the power tap circuit board 290 is loaded through the slot 318 in the mezzanine circuit board 312 into the receptacle 326 of the tap connector housing 320. The mezzanine circuit board 312 is configured to be located in closer proximity to the host circuit board 102 in such embodiment, compared to the embodiment illustrated in FIG. 7. For example, in the embodiment illustrated in FIG. 7, the mezzanine circuit board 312 is located above the power tap circuit board 290. In contrast, in the embodiment illustrated in FIG. 11, the mezzanine circuit board 312 is approximately centered along the height of the power tap circuit board 290. Optionally, the mezzanine circuit board 312 may be located closer to the bottom of the power tap circuit board 290 and the top of the power tap circuit board 290.

Figure 12:
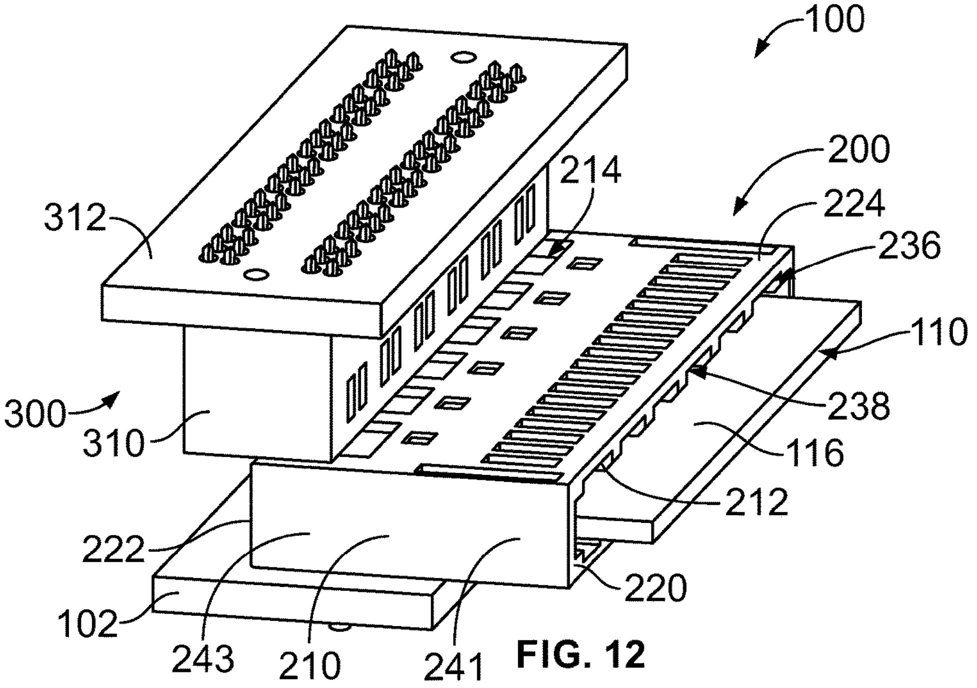
FIG. 12 illustrates the electrical connector system in accordance with an exemplary embodiment showing the tap connector assembly mated with the power connector assembly.
Figure 13:
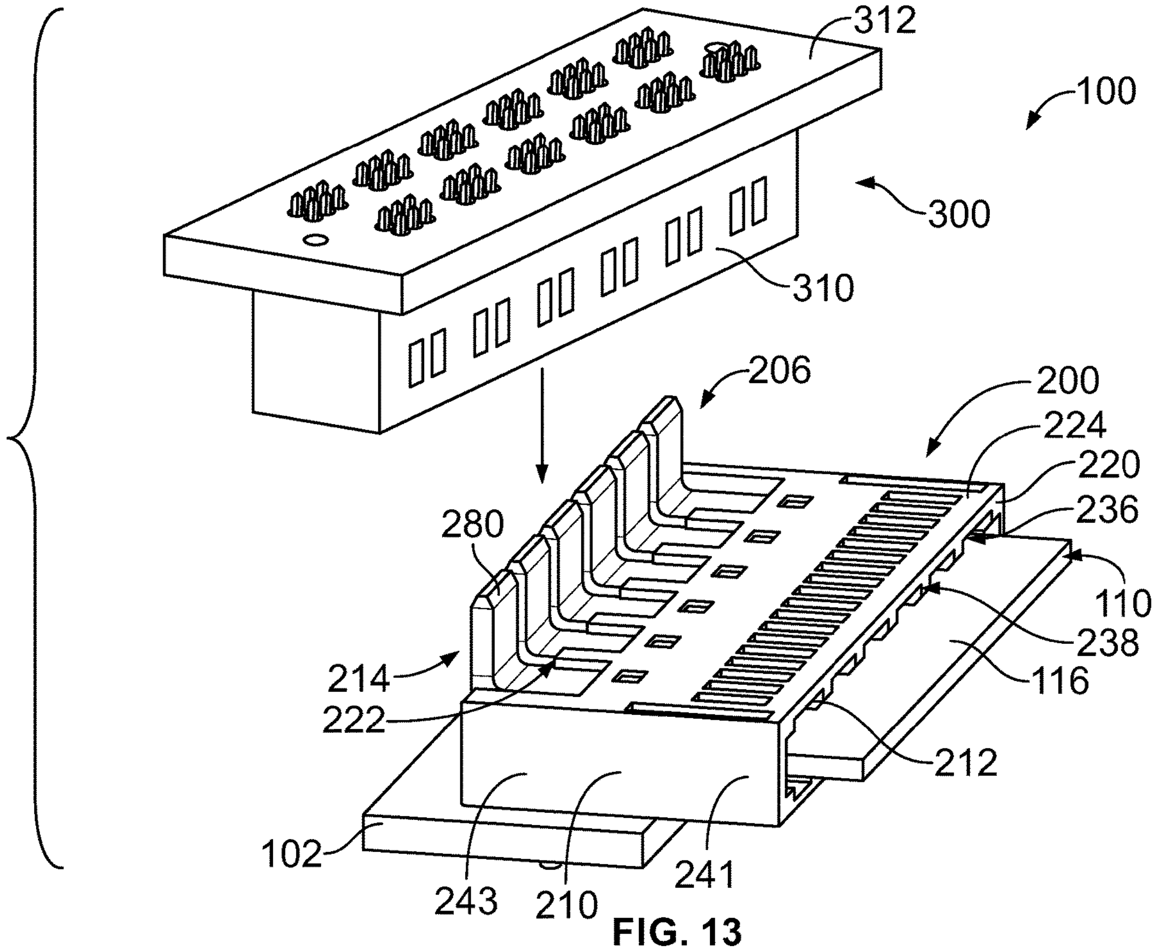
FIG. 13 illustrates the electrical connector system in accordance with an exemplary embodiment showing the tap connector assembly above the power connector assembly poised for mating with the power connector assembly.

FIG. 12 illustrates the electrical connector system 100 in accordance with an exemplary embodiment showing the tap connector assembly 300 mated with the power connector assembly 200. FIG. 13 illustrates the electrical connector system 100 in accordance with an exemplary embodiment showing the tap connector assembly 300 above the power connector assembly 200 poised for mating with the power connector assembly 200. In the illustrated embodiment, the power tap module 214 of the power connector assembly 200 includes stamped and formed power tap contacts 280 rather than the power tap circuits of a power tap circuit board, such as the power tap circuit board 290 shown in FIGS. 1-10.

The power connector assembly 200 includes the power connector housing 210 holding the power contacts 212. In the illustrated embodiment, the power connector housing 210 is a single-piece housing rather than the multi-piece housing shown in FIG. 3. The power connector housing 210 includes a rear housing portion 243 at the rear 222 that extends along and is mounted to the host circuit board 102 and a front housing portion 241 at the front 220 that extends forward of the host circuit board 102. The front housing portion 241, which may be referred to as a front housing, is configured to be mated with the tap connector assembly 300. The power connector housing 210 includes the internal chamber 236 that receives the power contacts 212. For example, at the front housing portion 241, the internal chamber 236 defines the receptacle 238 (for example, card slot) that receives the plug element 116 of the supply connector assembly 110. In the illustrated embodiment, the plug element 116 is defined by a card edge of a circuit card. However, other types of plug elements may be used in alternative embodiments.

The power connector assembly 200 includes the power tap module 214 coupled to the power connector housing 210. The power tap module 214 is electrically connected to the power contacts 212 to form a power tap or power takeoff from the power contacts 212. In an exemplary embodiment, the power tap module 214 includes the power tap contacts 280. Optionally, the power tap contacts 280 may be individual contacts separately coupled to the power connector housing 210 and/or the power contacts 212. In other embodiments, the power tap contacts 280 may be connected together by a separate contact holder (not shown), such as an overmold body that is overmolded over the power tap contacts 280. The power tap contacts 280 extend from the top 224 of the power connector housing 210 and are exposed at the exterior of the power connector housing 210 for connection to the tap connector assembly 300. The power tap contacts 280 define the tap interface 206.

The tap connector 310 of the tap connector assembly 300 is shown coupled to the mezzanine circuit board 312. The tap connector 310 is configured to be coupled to the tap interface 206 of the power connector assembly 200 to supply power to the mezzanine circuit board 312.

Figure 14:
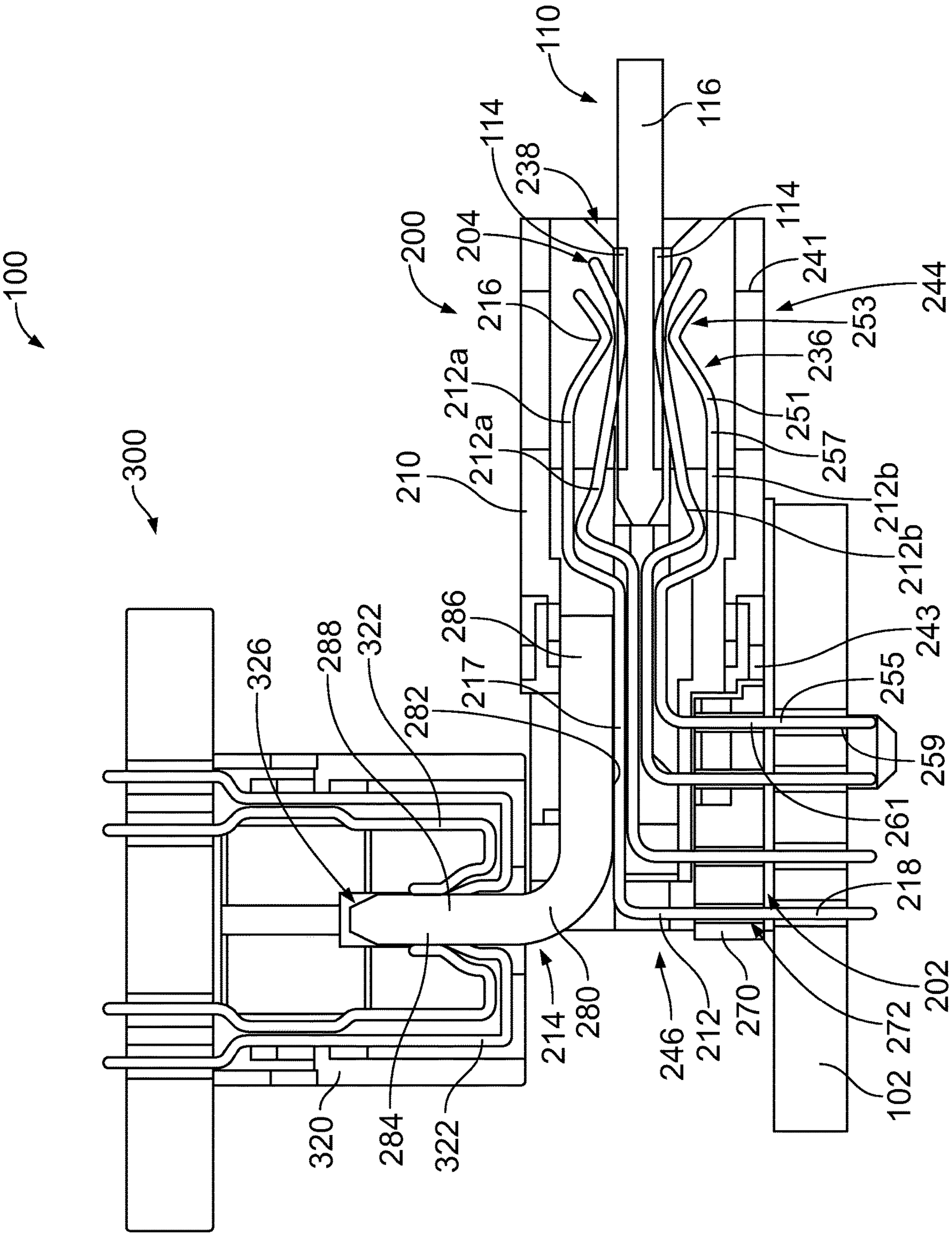
FIG. 14 is a cross-sectional view of the electrical connector system in accordance with an exemplary embodiment.

FIG. 14 is a cross-sectional view of the electrical connector system 100 in accordance with an exemplary embodiment. The stamped and formed power tap contacts 280 of the power tap module 214 are coupled to the power connector housing 210 and/or the power contacts 212 to form power taps or power take-offs from the power contacts 212 to supply power to the tap connector assembly 300.

The power contacts 212 are held by the power connector housing 210. Mating portions 216 of the power contacts 212 are provided at the mating interface 204 for mating with the supply connector assembly 110. Mounting portions 218 of the power contacts 212 are provided at the board interface 202 for electrical connection with the host circuit board 102. Tap portions 217 of the power contacts 212 are located between the mating portions 216 and the mounting portions 218 for electrical connection to the power tap module 214. Optionally, the tap portions 217 may be approximately centered along the power contacts 212 between the mating portions 216 and the mounting portions 218.

In an exemplary embodiment, the power contacts 212 are stamped and formed contacts. The power contacts may be uniform and continuous from the mating portions 216 to the mounting portions 218 of the power contacts 212. For example, the mating portions 216, the tap portions 217, and the mounting portions 218 are integral with each other, such as being stamped and formed from the same metal sheet.

In an exemplary embodiment, each power contact 212 includes a front portion 251 and a rear portion 261. The front portions 251, which may be referred to as front power contacts, are received in the front housing portion 241 of the power connector housing 210. For example, the front portions 251 are located in the receptacle 238 for mating with the plug element 116 of the supply connector assembly 110. The rear portions 261, which may be referred to as rear power contacts, are received in the rear housing portion 243 of the power connector housing 210, such as in a rear receptacle or contact channels forming the internal chamber 236 at the rear portion of the power connector housing 210. The front portions 251 define the mating portions 216 of the power contacts 212. The rear portions 261 define the mounting portions 218 of the power contacts 212.

In an exemplary embodiment, the front housing portion 241 of the power connector housing 210 and the front portions 251 of the power contacts 212 form the front interface module 244 of the power connector assembly 200. The rear housing portion 243 of the power connector housing 210 and the rear portions 261 of the power contacts 212 form the rear interface module 246 of the power connector assembly 200. The power tap module 214 is coupled to the front interface module 244 and/or the rear interface module 246.

In an exemplary embodiment, the power contacts 212 may be formed from one or more lead frames. Each power contact 212 extends between a mating end 253 and a terminating end 255. The mating end 253 is located within the receptacle 238 for electrical connection to the supply connector assembly 110. In the illustrated embodiment, the mating end 253 includes a deflectable spring beam 257. Optionally, the mating end 253 may include multiple spring beams 257. Other types of interfaces may be provided at the mating end 253, such as a blade, a pin, a socket, a tuning fork contact, and the like. In an exemplary embodiment, the power contact 212 includes a solder tail 259 at the terminating end 255 configured to be soldered to the host circuit board 102. Optionally, the terminating end 255 may include multiple solder tails 259. Other types of interfaces may be provided at the terminating end 255, such as a compliant pin, a press-fit pin, a solder pad, a solder ball, a mating pin, a socket, and the like. In an exemplary embodiment, the terminating ends 255 are coupled to the pin organizer 270, such as passing through the openings 272 to hold the terminating ends 255 for connection to the host circuit board 102.

In an exemplary embodiment, the power contacts 212 are arranged in multiple arrays. For example, the power contacts 212 may be arranged in an upper array of upper power contacts **212*a* and a lower array of the lower power contacts 212*b*. The upper power contacts 212*a* are arranged in one or more rows above the receptacle 238 for interfacing with the supply connector contacts 114 along the upper surface of the plug element 116. The lower power contacts 212*b* are arranged in one or more rows below the receptacle 238 for interfacing with the supply connector contacts 114 along the lower surface of the plug element 116**.

The power tap module 214 is used to electrically connect the power contacts 212 and the tap connector assembly 300 to transfer power from the supply connector assembly 110 to the tap connector assembly 300. The power tap module 214 includes a plurality of the power tap contacts 280, which are electrically connected to the corresponding power contacts 212. Each power tap contact 280 extends between the contact interface 282 and the tap interface 284. In an exemplary embodiment, the power tap contact 280 is a stamped and formed contact. The power tap contact 280 is stamped from a metal sheet and formed into a predetermined shape, such as an L-shape. Alternately the power tap contact 280 could be made using alternate manufacturing methods such as machined from thicker material, extruded and cut to length, and the like. For example, the power tap contact 280 is a right-angle contact. The power tap contact 280 includes a base 286 and a mating tab 288 extending from the base 286. The base 286 defines the contact interface 282. The mating tab 288 defines the tap interface 284. The tap interface 284 is configured to be connected to the corresponding tap contact 322 of the tap connector assembly 300. For example, the mating tab 288 may be plugged into the receptacle 326 of the tap connector housing 320 to interface with the tap contacts 322. Optionally, tap contacts 322 may engage both sides of the mating tab 288.

When assembled, the contact interface 282 at the base 286 is configured to be connected to the corresponding power contact 212. For example, the contact interface 282 may be welded or soldered to the power contact 212, such as to the tap portion 217. Optionally, multiple power contacts 212 may be connected to the same power tap contact 280. For example, the power connector assembly 200 may include a pair of upper power contacts **212*a* (for example, arranged in two rows) and a pair of lower power contacts 212*b* (for example, arranged in two rows). The tap portions 217 of the upper power contacts 212*a* may be connected together, such as by physical contact and/or welding or soldering, such that the power tap contact 280 is electrically connected to both of the upper power contacts 212*a*. The tap portions 217 of the lower power contacts 212*b* may be connected together, such as by physical contact and/or welding or soldering, which may be directly or indirectly connected to the power tap contact 280. In the illustrated embodiment, the tap portions 217 of the lower power contacts 212*b* are connected to the tap portions 217 of the upper power contacts 212*a*, such as by physical contact and/or welding or soldering, such that the power tap contact 280 is electrically connected to both of the lower power contacts 212*b* through the upper power contacts 212*a***.

Power is supplied to the power tap contact 280 through the power contacts 212. Power is supplied from the power contacts 212 to the tap connector assembly 300 through the power tap contacts 280. Power is supplied to the host circuit board 102 through the power contacts 212.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A power connector assembly configured to transfer power between a supply connector assembly and a tap connector assembly, the power connector assembly comprising:

a front interface module configured to be mated with the supply connector assembly, the front interface module including a front housing having a front receptacle and front power contacts in the front receptacle configured to be mated with the supply connector assembly;

a rear interface module configured to be mounted to a host circuit board, the rear interface module including a rear housing having a rear receptacle and rear power contacts in the rear receptacle configured to be terminated to the host circuit board; and a power tap module between the front interface module and the rear interface module, the power tap module including power tap contacts, each power tap contact being electrically connected to the corresponding front power contact and the corresponding rear power contact, each power tap contact including a tap interface exterior of the front housing and exterior of the rear housing, the tap interface configured to be terminated to the tap connector assembly, the power tap contact electrically connecting the front power contact and the tap connector assembly to transfer power from the supply connector assembly to the tap connector assembly.

2. The power connector assembly of claim 1, wherein the power tap module separates the front interface module from the rear interface module.

3. The power connector assembly of claim 1, wherein the power tap module includes a power tap circuit board having power tap circuits on a substrate, the power tap circuits defining the power tap contacts, the power tap circuit board having a card edge configured to be plugged into the tap connector assembly.

4. The power connector assembly of claim 3, wherein the power tap circuit board includes a front surface and a rear surface, the power tap circuits including front circuits and rear circuits, the front circuits being electrically connected to the rear circuits through the substrate, the front power contacts being terminated to the front circuits, the rear power contacts being terminated to the rear circuits.

5. The power connector assembly of claim 1, wherein each front power contact includes a mating end and a terminating end, the terminating end being terminated to the corresponding power tap contact, the mating end including a spring beam configured to be coupled to the supply connector assembly, and wherein each rear power contact includes a mating end and a terminating end, the mating end being coupled to the corresponding power tap contact, the terminating end configured to be terminated to the host circuit board.

6. The power connector assembly of claim 5, wherein the terminating ends of the front power contacts are soldered to the power tap contacts and the mating ends of the rear power contacts are soldered to the power tap contacts.

7. The power connector assembly of claim 1, wherein the front power contacts include an upper array of upper front power contacts and a lower array of lower front power contacts, the upper front power contacts facing the lower front power contacts across a receptacle slot at a mating end of the front housing configured to receive a plug element of the supply connector assembly, each power tap contact being electrically connected to the corresponding upper front power contact and being electrically connected to the corresponding lower front power contact.

8. The power connector assembly of claim 7, wherein the rear power contacts include an upper array of upper rear power contacts and a lower array of lower rear power contacts, each power tap contact being electrically connected to the corresponding upper rear power contact and being electrically connected to corresponding lower rear power contact.

9. The power connector assembly of claim 1, wherein the rear power contacts are right-angle contacts having mating ends oriented perpendicular to terminating ends.

10. The power connector assembly of claim 1, wherein the front interface module is a card edge connector mounted to a front surface of the power tap module.

11. A power connector assembly configured to transfer power between a supply connector assembly and a tap connector assembly, the power connector assembly comprising:

a power connector housing extending between a front and a rear, the power connector housing having a mating end at the front configured to be mated with the supply connector assembly, the power connector housing having a mounting end at the rear configured to be mounted to a host circuit board, the power connector housing having an internal chamber;

power contacts received in the internal chamber of the power connector housing, the power contacts including an upper array or upper power contacts and a lower array of lower power contacts, the upper power contacts facing the lower power contacts across a receptacle slot at the mating end, the upper power contacts provided at the mating end for electrical connection with the supply connector assembly, the upper power contacts provided at the mounting end for electrical connection with the host circuit board, the lower power contacts provided at the mating end for electrical connection with the supply connector assembly, the lower power contacts provided at the mounting end for electrical connection with the host circuit board; and a power tap module coupled to the power connector housing, the power tap module including power tap contacts, each power tap contact being electrically connected to the corresponding upper power contact and the corresponding lower power contact, each power tap contact including a tap interface exterior of the power connector housing, the tap interface configured to be terminated to the tap connector assembly, the power tap contacts electrically connecting the upper and lower power contacts with the tap connector assembly to transfer power from the supply connector assembly to the tap connector assembly.

12. The power connector assembly of claim 11, wherein the power connector housing includes a front housing at the front and a rear housing at the rear, the internal chamber having a front receptacle along the front housing and a rear receptacle along the rear housing, the power contacts including front power contacts in the front receptacle configured to be mated with the supply connector assembly and rear power contacts in the rear receptacle configured to be terminated to the host circuit board, each power tap contact being electrically connected to the corresponding front power contact and the corresponding rear power contact.

13. The power connector assembly of claim 12, wherein the front housing is separate and discrete from the rear housing, the power tap module including a power tap circuit board located between and separating the front housing from the rear housing, the front power contacts being terminated to a front surface of the power tap circuit board, the rear power contacts being terminated to a rear surface of the power tap circuit board.

14. The power connector assembly of claim 13, wherein the power tap circuit board includes power tap circuits defining the power tap contacts, the power tap circuit board having a card edge configured to be plugged into the tap connector assembly.

15. The power connector assembly of claim 11, wherein the power tap contacts are stamped and formed contacts, each power tap contact including a base and a mating tab extending from the base, the base being coupled to at least one of the upper power contact or the lower power contact, the mating tab defining the tap interface configured to be mated to the tap connector assembly.

16. An electrical connector system comprising:

a power connector assembly including a power connector housing holding power contacts and a power tap module, the power connector housing extending between a front and a rear, the power connector housing having a mating end at the front configured to be mated with the supply connector assembly, the power connector housing having a mounting end at the rear configured to be mounted to a host circuit board, the power contacts including an upper array or upper power contacts and a lower array of lower power contacts, the upper power contacts facing the lower power contacts across a receptacle slot at the mating end, the upper power contacts provided at the mating end for electrical connection with the supply connector assembly, the upper power contacts provided at the mounting end for electrical connection with the host circuit board, the lower power contacts provided at the mating end for electrical connection with the supply connector assembly, the lower power contacts provided at the mounting end for electrical connection with the host circuit board, the power tap module including power tap contacts, each power tap contact being electrically connected to the corresponding upper power contact and the corresponding lower power contact, each power tap contact including a tap interface exterior of the power connector housing; and a tap connector assembly coupled to the power connector assembly, the tap connector assembly including a tap connector housing holding tap contacts, the tap contacts including tap mating interfaces coupled to the tap interfaces of the corresponding tap contacts to electrically connect to the power connector assembly to transfer power from the supply connector assembly to the tap connector assembly.

17. The electrical connector system of claim 16, wherein the tap connector assembly includes a mezzanine circuit board, the tap connector being mounted to the mezzanine circuit board, the tap contacts being terminated to the mezzanine circuit board.

18. The electrical connector system of claim 17, wherein the mezzanine circuit board includes a slot aligned with a tap connector receptacle of the tap connector housing, the power tap module being loaded into the tap connector receptacle through the slot in the mezzanine circuit board.

19. The electrical connector system of claim 16, wherein the power connector housing includes a front housing at the front and a rear housing at the rear, the internal chamber having a front receptacle along the front housing and a rear receptacle along the rear housing, the power contacts including front power contacts in the front receptacle configured to be mated with the supply connector assembly and rear power contacts in the rear receptacle configured to be terminated to the host circuit board, each power tap contact being electrically connected to the corresponding front power contact and the corresponding rear power contact.

20. The electrical connector system of claim 16, wherein the power tap contacts are stamped and formed contacts, each power tap contact including a base in the mating tab extending from the base, the base being coupled to at least one of the upper power contact or the lower power contact, the mating tab defining the tap interface configured to be mated to the tap connector assembly.

* * * * *